United States Patent
Tieu (10) Patent No.: US 8,552,671 B2
(45) Date of Patent: Oct. 8, 2013

(54) SENSORLESS MOTOR CONTROL USING THE RATE OF CHANGE OF THE INDUCTIVE RISE TIME

(75) Inventor: Triet M. Tieu, Frisco, TX (US)

(73) Assignee: Texas Instruments Incorporated, Dallas, TX (US)

( * ) Notice: Subject to any disclaimer, the term of this patent is extended or adjusted under 35 U.S.C. 154(b) by 149 days.

(21) Appl. No.: 13/163,063

(22) Filed: Jun. 17, 2011

(65) Prior Publication Data

US 2012/0319631 A1 Dec. 20, 2012

(51) Int. Cl.
*H02P 6/06* (2006.01)
(52) U.S. Cl.
USPC ............ 318/400.11; 318/400.32; 318/400.33; 318/400.34
(58) Field of Classification Search
USPC .......... 318/400.32, 400.33, 610, 616, 400.11, 318/400.34
See application file for complete search history.

(56) References Cited

U.S. PATENT DOCUMENTS

| | | | | |
|---|---|---|---|---|
| 4,992,710 A | * | 2/1991 | Cassat | 318/400.33 |
| 5,017,845 A | * | 5/1991 | Carobolante et al. | 318/400.11 |
| 5,028,852 A | * | 7/1991 | Dunfield | 318/400.33 |
| 5,254,914 A | * | 10/1993 | Dunfield et al. | 318/400.34 |
| 5,841,252 A | | 11/1998 | Dunfield | |
| 5,982,571 A | * | 11/1999 | Calfee et al. | 360/70 |
| 6,100,656 A | * | 8/2000 | El-Sadi et al. | 318/400.11 |
| 7,023,155 B2 | | 4/2006 | Tieu | |
| 7,589,484 B2 | * | 9/2009 | Sosseh et al. | 318/400.3 |
| 2004/0036436 A1 | * | 2/2004 | Tieu | 318/439 |

FOREIGN PATENT DOCUMENTS

EP 0462729 12/1991

OTHER PUBLICATIONS

U.S. Appl. No. 13/009,538, filed Jan. 19, 2011.

* cited by examiner

*Primary Examiner* — Rita Leykin
(74) *Attorney, Agent, or Firm* — Alan A. R. Cooper; W. James Brady, III; Frederick J. Telecky, Jr.

(57) ABSTRACT

A conventional method used for a startup mode for a brushless direct current (DC) motor employed complementary inductive rise times. Specifically, inductive rise times rise times for a driving state and its complementary state were compared to one another such that when the inductive rise times cross a switching point had been reached. This methodology, however, significantly affects the efficiency of the driving torque and power consumption. Here, however, a derivative of the inductive rise time is employed, which can determine the switching event without the need for a use of a complementary state, improving motor performance.

21 Claims, 7 Drawing Sheets

SENSORLESS MOTOR CONTROL USING THE RATE OF CHANGE OF THE INDUCTIVE RISE TIME

TECHNICAL FIELD

The invention relates generally to brushless direct current (DC) motors and, more particularly, to startup of a sensorless, brushless DC motor.

BACKGROUND

Typical brushless DC motors are controlled by electronics due to the lack of the self commutation brushes. Electronic systems driving brushless DC motors use the knowledge of the rotor position in order to commutate properly. Hall-effect sensors, one of the popular choices, are used to decode the position of the rotor as it advances. The disadvantages of the Hall-effect sensors are cost, mounting spaces, and performance degradation due to aging. A sensorless motor start up would overcome the problems presented above. A sensorless motor startup would acquire the position information as the rotor advances without the use of external sensors.

Figure 1:
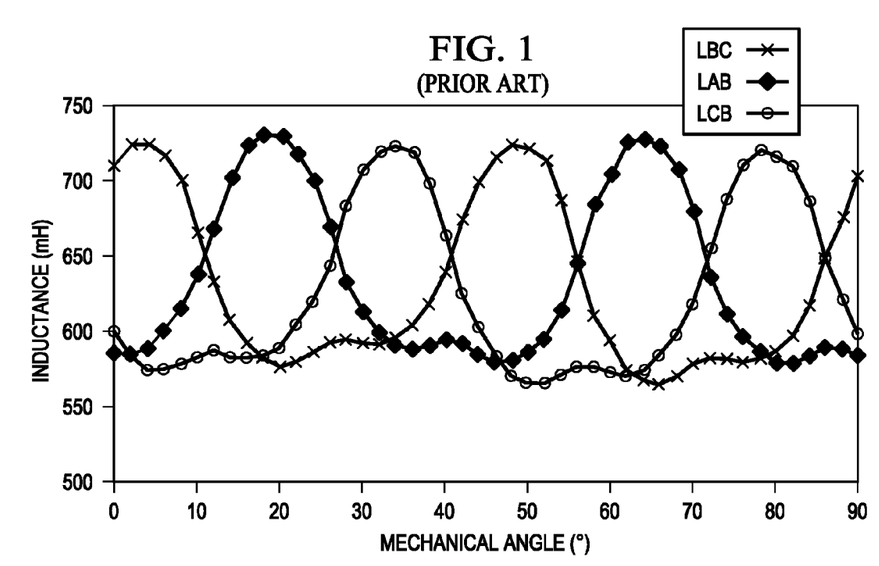
FIG. 1 is a diagram depicting phase-to-phase inductance for a three-phase brushless DC motor.

One of the sensorless startup methods is based on the principal that the inductance of the rotor is a function of its position. In particular, the relationship of the inductance and the rotor position depends on the stator, the rotor, the direction of the current, and the mechanical structure of the motor itself. Generally, the inductance, measured from phase-to-phase, is a function of the rotor's position, which includes the primary inductance and the mutual inductance of the motor. The primary inductance usually depends on the length of the wire, material properties of the wire (i.e., conductivity), and properties of the coil (i.e., number of turns), and the mutual inductance usually depends on the change of the magnetic field the nearby coils. The direction of the current also affects the magnetic field; thus it also affects the mutual inductance as well. As an example, in FIG. 1, an diagram depicting the phase-to-phase inductances for a three-phase brushless DC motor (i.e., LAB for A-to-B inductance, LBC for B-to-C inductance, and LCA for C-to-A inductance) as a function of mechanical angle.

Figure 2:
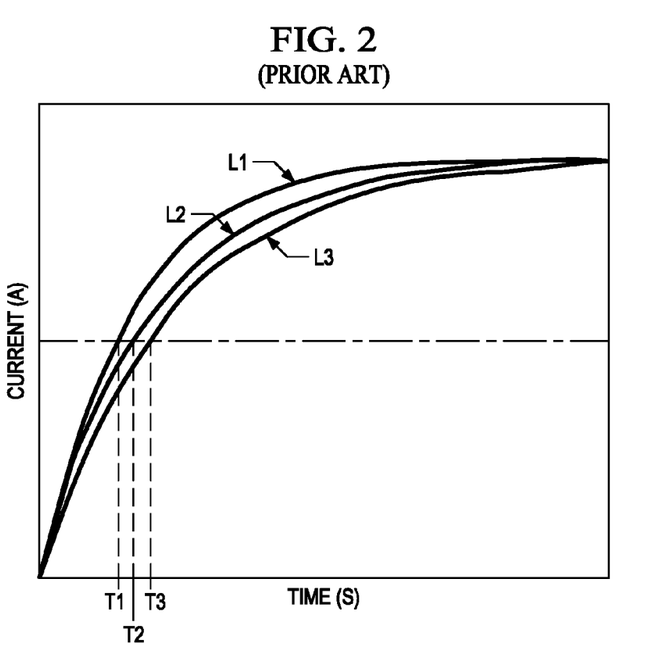
FIG. 2 is a diagram depicting inductive rise times as a function of inductance for a brushless DC motor.

For a three-phase brushless, sensorless DC motor, there are three phases (i.e., phases A, b, and C) that can be driven in six different ways, known as commutation states. The ability to measure the inductance of the six commutation states provides the information to derive the most optimal state to spin up a motor, and, because the inductance has an inverse relationship with the current driven into the coil, the current could be used to infer to the inductance. Namely, the rise time of the current can be used to determine inductance. In FIG. 2, a diagram depicting three inductances L1, L2, and L3 (i.e., 0.5 mH, 0.6 mH, and 0.7 mH, respectively) having current rise times of T1, T2, and T3 (i.e., 0.18 ms, 0.19 ms, and 0.21 ms, respectively).

Figure 3:
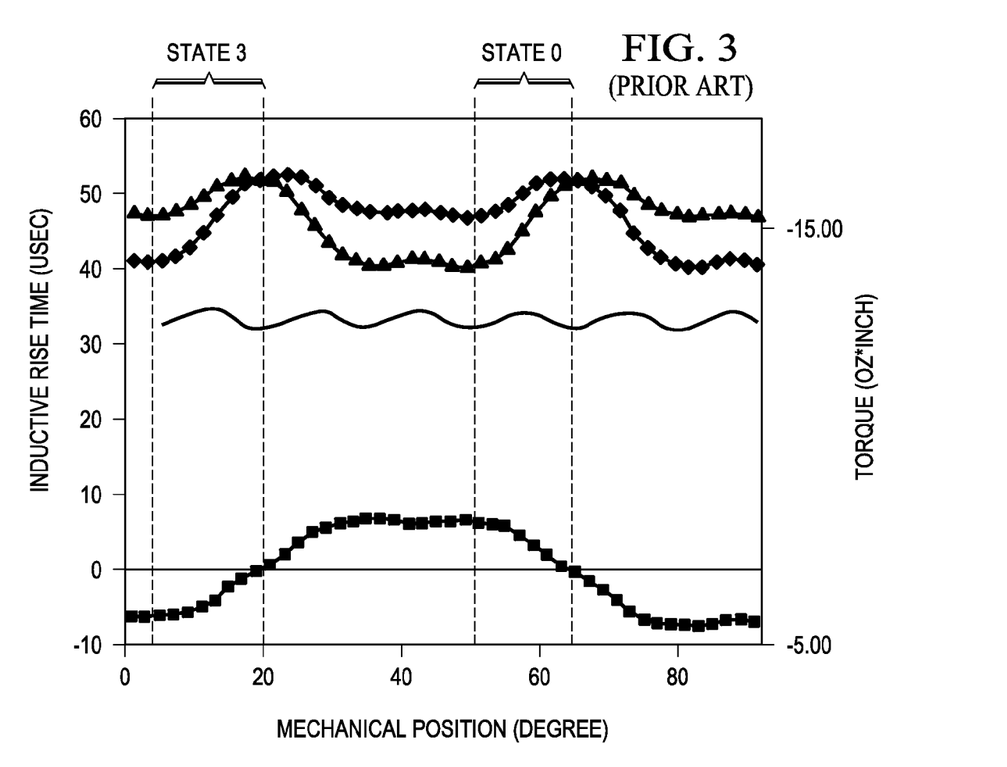
FIGS. 3 and 4 are diagrams depicting startup for a brushless DC motor using complementary inductive rise times.
Figure 4:
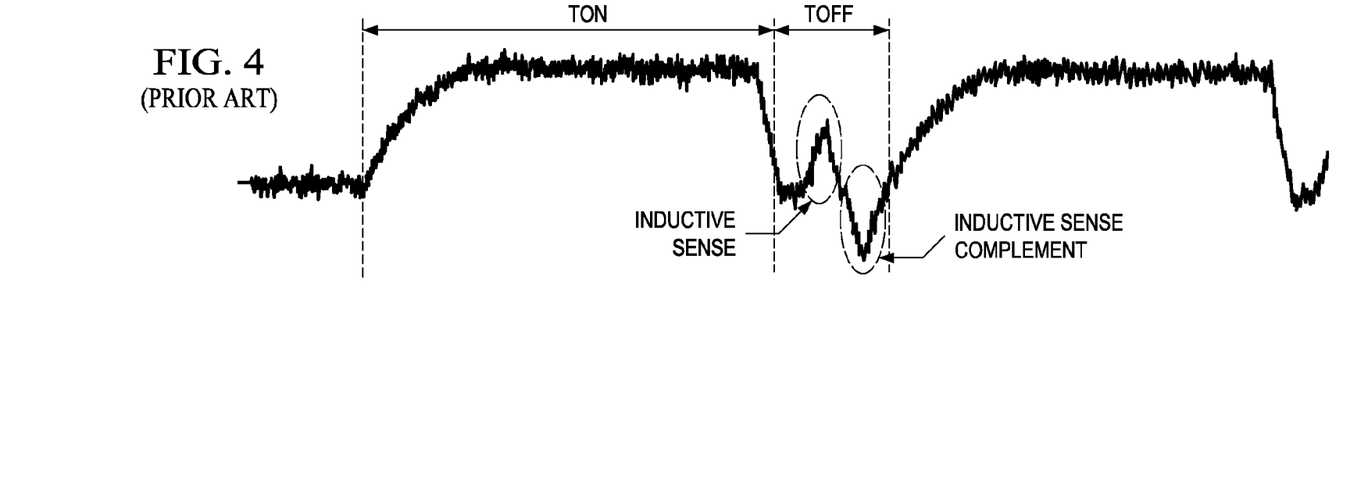

For startup in a conventional system, complementary commutation states are generally employed as shown in FIG. 3. Inductive rise times for a driving state and its complementary state are compared to one another such that when the inductive rise times cross each other a switching point has been reached. In the example of FIG. 3, the inductive rise times for states 3 and 0 are used to determine the next commutation switching point. These states (states 3 and 0) have use the same terminals, but the difference is the direction of the current flowing through the phases of the motor. As shown in FIG. 4, these measurements occur during an off-time interval TOFF (interval TOFF includes two coast intervals TCOAST and two sensing intervals TSENSE so as to sense the two inductive rise times). This methodology, however, significantly affects the efficiency of the driving torque and power consumption. Thus, there is a need for an improve start-up method and associated apparatus.

Some examples of conventions systems are: U.S. Pat. No. 5,841,252; 7,023,155; 7,589,484; U.S. Patent Pre-Grant Publ. No. 2004/0036436; European Patent No. EP0462729; and U.S. patent application Ser. No. 13/009,538.

SUMMARY

An embodiment of the present invention, accordingly, provides a method. The method comprises determining a current commutation state of a brushless direct current (DC) motor, wherein the current commutation state is one of a plurality of commutation states; calculating a derivative of an inductive rise time for the brushless DC motor based at least in part on a measurement of the inductive rise time; and advancing the brushless DC motor to a next commutation state based at least in part on the magnitude of the derivative.

In accordance with an embodiment of the present invention, the inductive rise time further comprises a first inductive rise time and a second inductive rise time, and wherein step of calculating further comprises: determining the first inductive rise time for a first interval; determining the second inductive rise time for a second interval, wherein each of the first and second intervals have a predetermined duration; calculating a difference between the first and second inductive rise times; and dividing the difference between the first and second inductive rise times by the predetermined duration.

In accordance with an embodiment of the present invention, the step of advancing further comprises advancing the brushless DC motor to the next commutation state if the magnitude of the derivative is less than or equal to zero.

In accordance with an embodiment of the present invention, the first interval further comprises an on-time interval and an off-time interval, and wherein step of determining the first inductive rise time for the first interval further comprises: driving the brushless DC motor during the on-time interval; coasting the brushless DC motor during the off-time interval; and measuring the first inductive rise time.

In accordance with an embodiment of the present invention, the on-time and off-time intervals further comprise a first on-time interval and a first off-time interval, and wherein the second interval further comprises a second on-time interval and a second off-time interval, and wherein step of determining the second inductive rise time for the second interval further comprises: driving the brushless DC motor during the second on-time interval; coasting the brushless DC motor during the second off-time interval; and measuring the second inductive rise time.

In accordance with an embodiment of the present invention, the step of calculating further comprises: determining the inductive rise time for an interval; and determining when the inductive rise time has peaked.

In accordance with an embodiment of the present invention, the step of advancing further comprises advancing the brushless DC motor to the next commutation state when the inductive rise time has peaked.

In accordance with an embodiment of the present invention, the interval further comprises an on-time interval and an off-time interval, and wherein step of determining the first inductive rise time for the first interval further comprises: driving the brushless DC motor during the on-time interval; coasting the brushless DC motor during the off-time interval; and measuring the first inductive rise time.

In accordance with an embodiment of the present invention, a method is provided. The method comprises determining first and second inductive rise times for each of a pair of interval during a first commutation state of a brushless DC motor, wherein each interval has a predetermined duration; calculating the rate of change between the first and second inductive rise times; and advancing the brushless DC motor to a second commutation state based at least in part on the magnitude of the rate of change.

In accordance with an embodiment of the present invention, the method further comprises adjusting the predetermined duration based at least in part on a speed of the brushless DC motor after the step of advancing.

In accordance with an embodiment of the present invention, each interval further comprises an on-time interval and an off-time interval, and wherein the step of calculating further comprises: calculating a difference between the first and second inductive rise times; and dividing the difference between the first and second inductive rise times by the predetermined duration.

In accordance with an embodiment of the present invention, each interval further comprises an on-time interval and an off-time interval, and wherein step of determining the first and second inductive rise times further comprises: driving the brushless DC motor during the on-time interval for each interval; coasting the brushless DC motor during the off-time interval for each interval; and measuring the first and second inductive rise times.

In accordance with an embodiment of the present invention, the step of advancing further comprises advancing the brushless DC motor to the next commutation state if the magnitude of the rate of change is less than or equal to zero.

In accordance with an embodiment of the present invention, an apparatus is provided. The apparatus comprises a drive circuit that is configured to drive a brushless DC motor; a sense circuit that is coupled to drive circuit, wherein sense circuit is adapted to measure a first and second coil currents for a pair of intervals during a first commutation state of the brushless DC motor, and wherein each interval has a predetermined duration; control circuitry that is coupled to the sense circuit and the drive circuit, wherein the control circuitry is configured to determines first and second inductive rise times from first and second coil currents, and wherein the control circuitry is configured to calculate the rate of change between the first and second inductive rise times, and wherein the control circuit is configured to provide a signal to the drive circuit to advance the brushless DC motor to a second commutation state based at least in part on the magnitude of the rate of change.

In accordance with an embodiment of the present invention, the control circuitry further comprises a processor and memory with a computer program embodied thereon, wherein the computer program comprises computer code to calculate the rate of change between the first and second inductive rise times.

In accordance with an embodiment of the present invention, the computer program further comprises computer code for adjusting the predetermined duration based at least in part on a speed of the brushless DC motor.

In accordance with an embodiment of the present invention, each interval further comprises an on-time interval and an off-time interval, and wherein the computer code to calculate the rate of change further comprises: computer code for calculating a difference between the first and second inductive rise times; and computer code for dividing the difference between the first and second inductive rise times by the predetermined duration.

In accordance with an embodiment of the present invention, the control circuitry is configured to advance the brushless DC motor to the next commutation state if the magnitude of the rate of change is less than or equal to zero.

In accordance with an embodiment of the present invention, the control circuitry further comprises a controller that is coupled to the processor and the drive circuit.

In accordance with an embodiment of the present invention, the drive circuit further comprises: a driver that is configured to be coupled to the brushless DC motor; and a pre-driver that is coupled between the controller and the driver.

In accordance with an embodiment of the present invention, the apparatus further comprises the brushless DC motor.

In accordance with an embodiment of the present invention, the processor further comprises a digital signals processor (DSP).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Refer now to the drawings wherein depicted elements are, for the sake of clarity, not necessarily shown to scale and wherein like or similar elements are designated by the same reference numeral through the several views.

Figure 5:
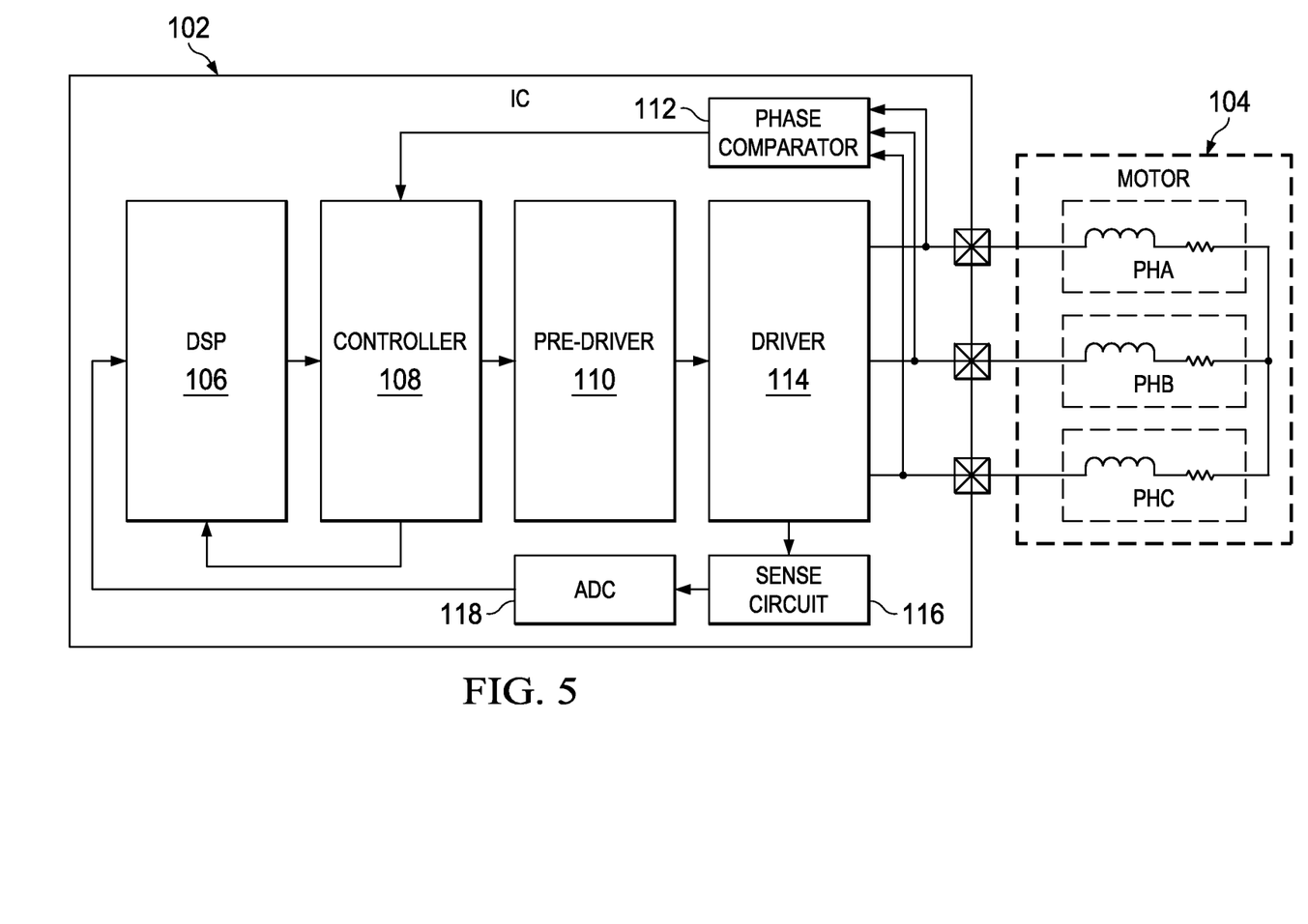
FIG. 5 is a diagram of an example of a system in accordance with an embodiment of the present invention.

Turning to FIG. 5, a system 100 in accordance with a preferred embodiment of the present invention can be seen. System 100 generally comprises an integrated circuit (IC) 102 and motor 104. The IC 102 generally comprises a digital signals processor (DSP) 106 (which typically includes a memory with a computer program embodied thereon), a controller 108, pre-driver 110, phase comparator 112, driver, 114, sense circuit 116, and an analog-to-digital converter (ADC) 118. In operation, the IC 102 generates an applied voltage and applied (or coil) current for the motor 104 (which can be a sensorless, brushless DC motor with any number of phases, but, for this example, phases PHA, PHB, and PHC are shown) to drive the motor 104. As the system 100 is operating, the sense circuit 116 (which can include a sense FET) is able to measure the applied or coil current, which can be digitized by the ADC 118. The phase comparator 112 also determines the phase of the applied voltage. The DSP 104 and controller 108 (which collectively operate as a control circuit or control circuitry) can generate a commutation clock signal based on these inputs. The commutation clock signal can then be converted into the applied voltage (and applied or coil current) for the motor 104 by the pre-driver 110 and driver 114.

Figure 6:
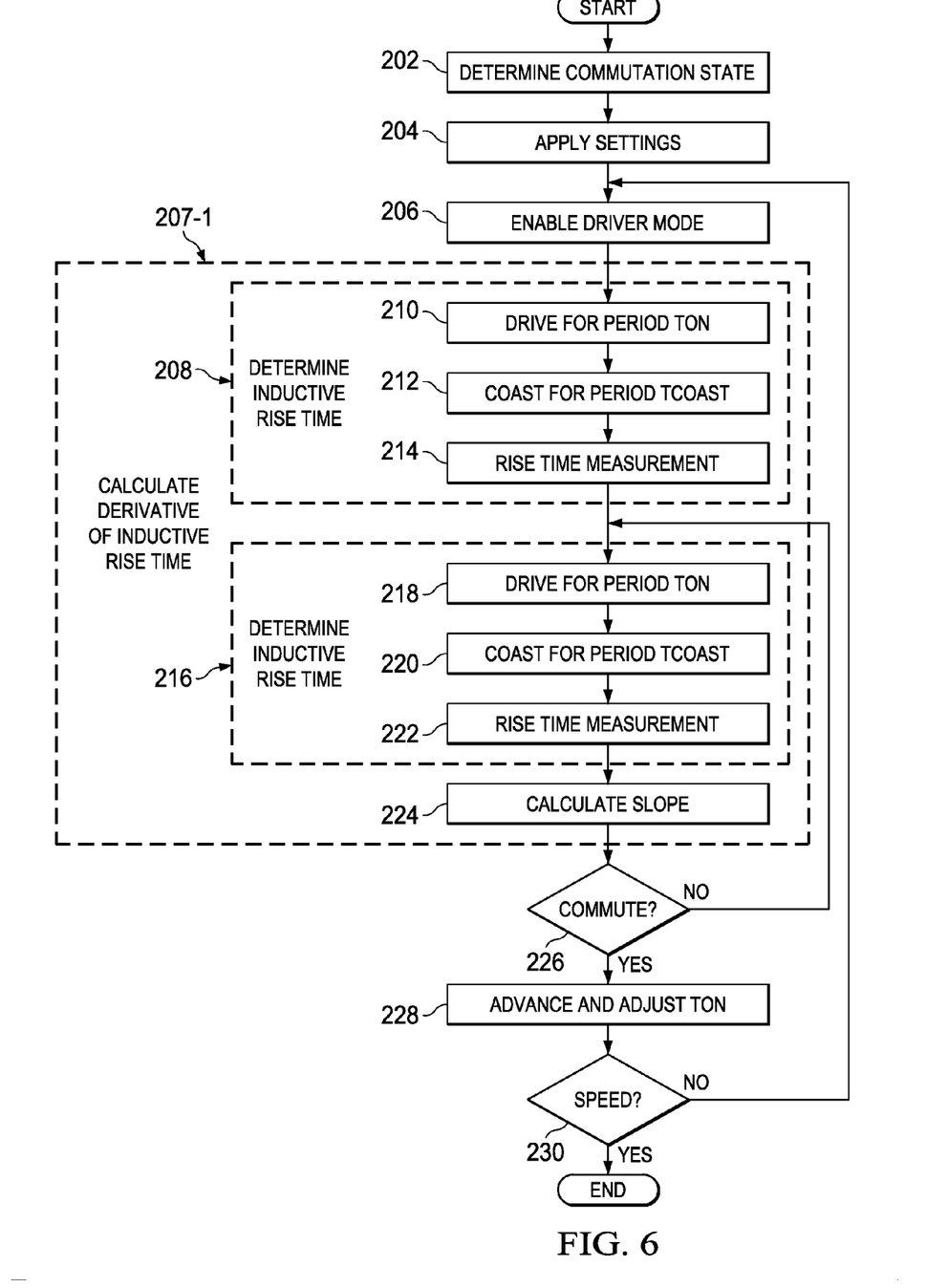
FIG. 6 is a flow chart depicting an example of a method for a brushless DC motor startup using the derivative of inductive rise time.
Figure 7:
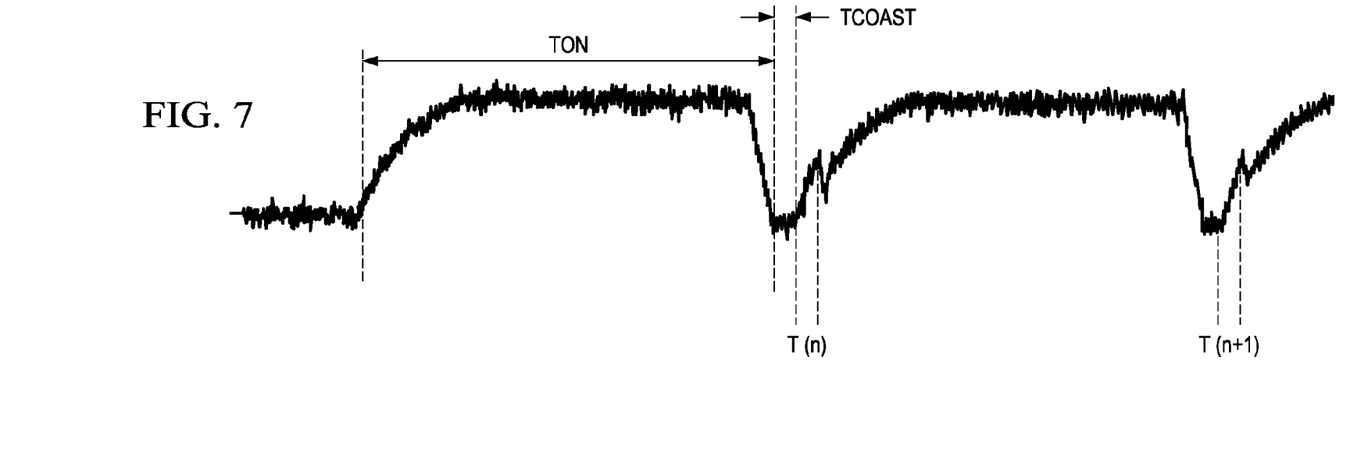
FIGS. 7 and 8 are diagrams depicting startup for a brushless DC motor using the method of FIG. 6.
Figure 8:
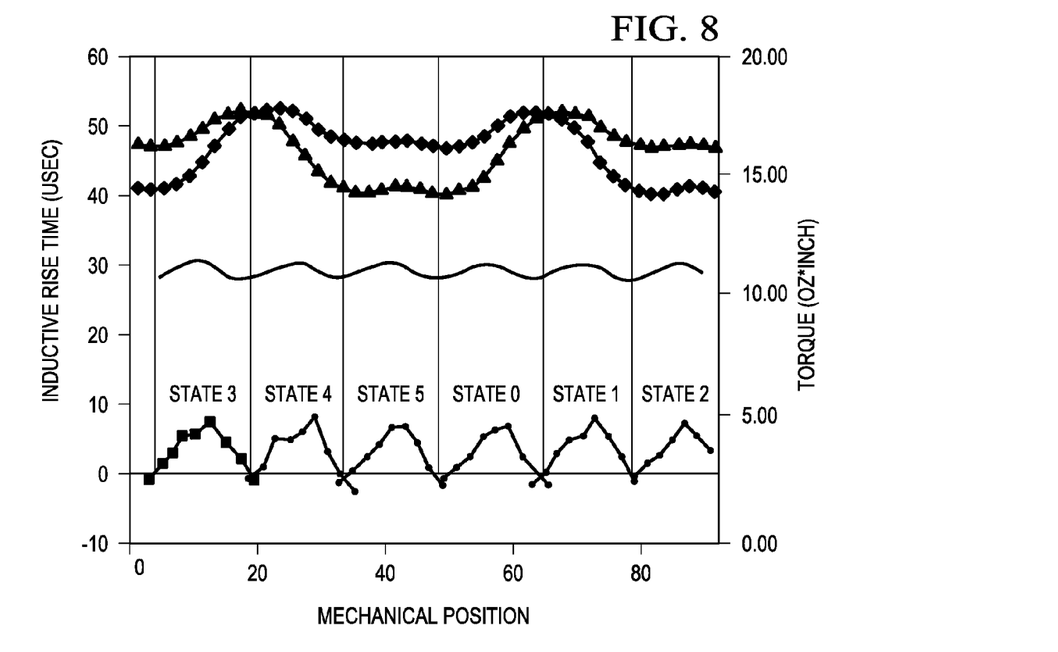

In contrast to conventional methods used for motor startup or a startup mode, the method employed by the system 100 (as shown in FIGS. 6-8) uses a derivative of inductive rise times. Initially, in step 202, the IC 102 determines the rotor position by using the inductive rise times of all commutations states (i.e., six commutation states for a three-phase motor) so as to obtain the initial driving commutation state. Once the initial driving commutation state is determined, current limits, on-time TON, and coast time TCOAST are set in step 204, and in step 206, the driver mode is set. With the driver mode set, the IC 102 calculates the derivative of the inductive rise time in step 207-1. IC 102 accomplishes this by determining inductive rise times for consecutive periods in steps 208 and 216. In each of these steps 208 and 216, the commutation state is driven for period TON in steps 210 and 216 (respectively), which can be seen in FIG. 7. The motor is then entered into a coast mode or "coasted" for period TCOAST (which is generally equal to interval or period TOFF for this example). The inductive rise times for these two consecutive period (i.e., T(n) and T(n+1)), as shown in FIG. 7, are measured in steps 214 and 222. Then in step 224, the slope is calculated. This slope is:

$$SLOPE = \frac{T(n) - T(n+1)}{SAMPLE} = \frac{T(n) - T(n+1)}{TON + TOFF} \quad (1)$$

This slope corresponds to derivative of the inductive rise time, and, when this slope approaches zero, the inductive rise time reaches a local maximum, indicating a point where the commutation state should be changed. Thus, in step 226, the magnitude of the slope can be examined to determine whether a local maximum has been reached. Typically, a change in sign of the slope (i.e., whether the slope has changed from positive to negative) indicates the local maximum. If it has not yet been reached, then it returns to step 218; otherwise, IC 102 advances the commutation state and adjusts periods TON due to a difference in speed (namely, for a higher speed) in step 228. Then, in step 230, the IC determines whether the speed is sufficiently high enough (i.e., between 200 and 1000 revolutions per minute) to exit a startup mode.

Figure 9:
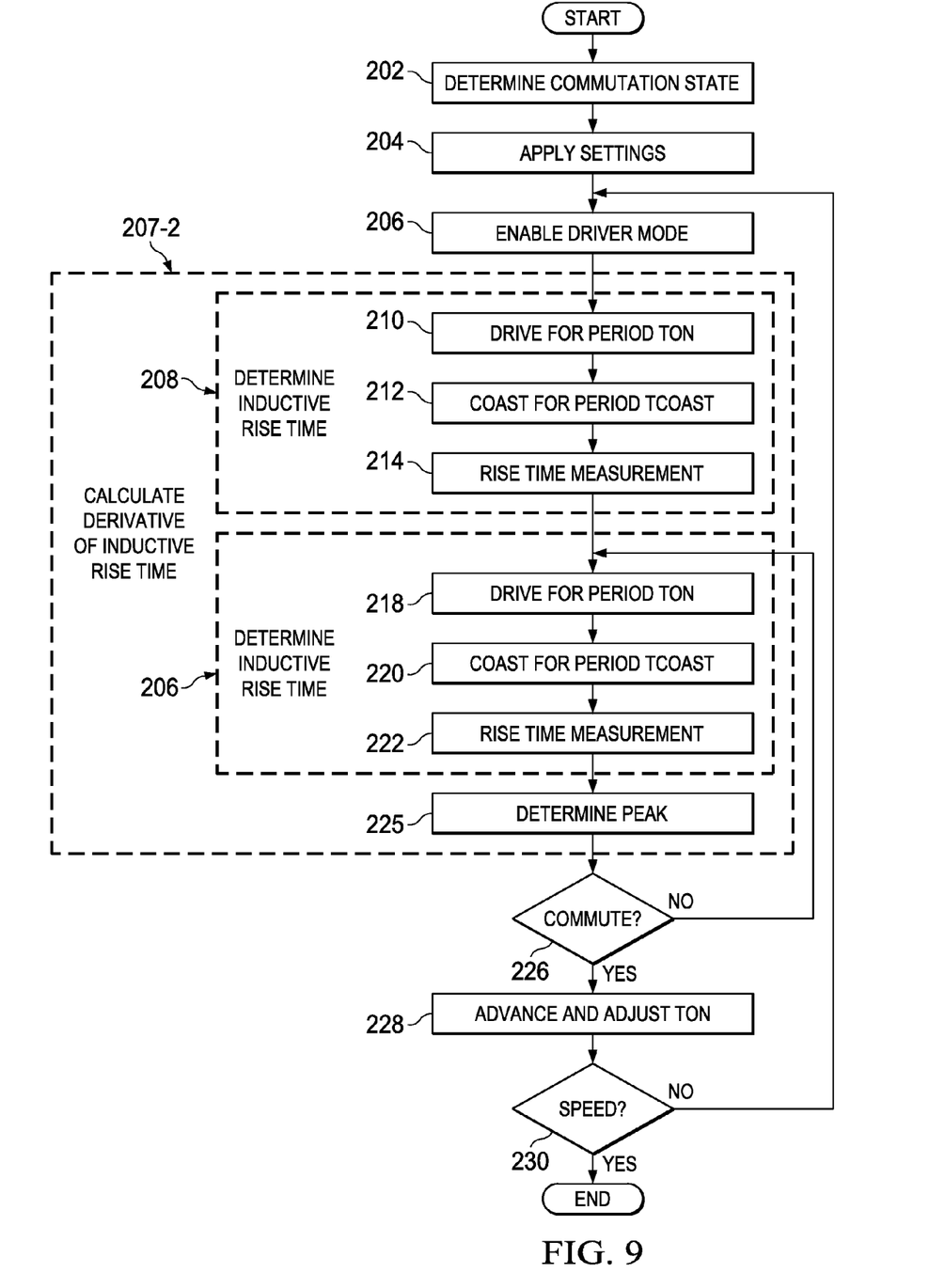
FIG. 9 is a flow chart depicting an example of a method for a brushless DC motor startup using the derivative of inductive rise time.
Figure 10:
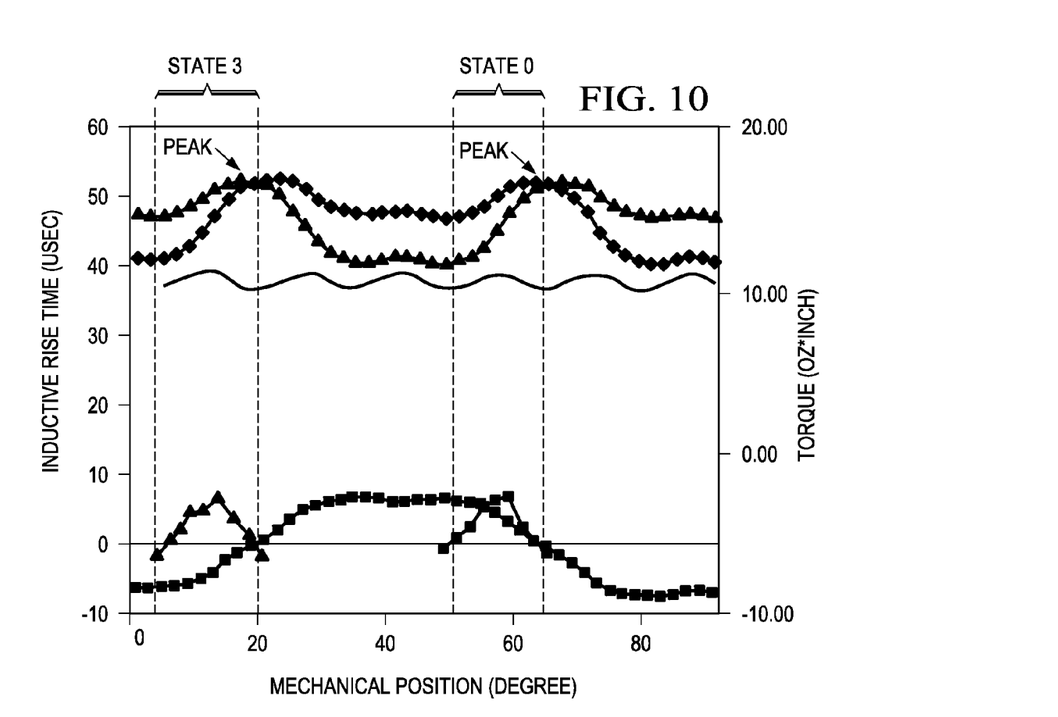
FIG. 10 is a diagram depicting startup for a brushless DC motor using the method of FIG. 9.

There are also several different manners in which the derivative of the inductive rise time can be calculated. As shown in FIGS. 9 and 10, calculation of the derivative of the inductive rise time can be performed by performing peak detection. In step 207-2, the inductive rise times are determined in step 208 and 216 (similar to step 207-1 of FIG. 6). However, instead of performing a slope calculation (as with step 207-1 of FIG. 6), the two inductive rise times are compared with one another to determine whether a peak has been reached in step 225, which generally corresponds to a local maximum.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed:

1. A method comprising:
   determining a current commutation state of a brushless direct current (DC) motor, wherein the current commutation state is one of a plurality of commutation states;
   calculating a derivative of an inductive rise time for the brushless DC motor based at least in part on a measurement of the inductive rise time; and
   advancing the brushless DC motor to a next commutation state based at least in part on the magnitude of the derivative,
   wherein the inductive rise time further comprises a first inductive rise time and a second inductive rise time, and wherein step of calculating further comprises:
      determining the first inductive rise time for a first interval;
      determining the second inductive rise time for a second interval, wherein each of the first and second intervals have a predetermined duration;
      calculating a difference between the first and second inductive rise times; and
      dividing the difference between the first and second inductive rise times by the predetermined duration.

2. The method of claim 1, wherein the step of advancing further comprises advancing the brushless DC motor to the next commutation state if the magnitude of the derivative is less than or equal to zero.

3. The method of claim 2, wherein the first interval further comprises an on-time interval and an off-time interval, and wherein step of determining the first inductive rise time for the first interval further comprises:
   driving the brushless DC motor during the on-time interval;
   coasting the brushless DC motor during the off-time interval; and
   measuring the first inductive rise time.

4. The method of claim 3, wherein the on-time and off-time intervals further comprise a first on-time interval and a first off-time interval, and wherein the second interval further comprises a second on-time interval and a second off-time interval, and wherein step of determining the second inductive rise time for the second interval further comprises:
   driving the brushless DC motor during the second on-time interval;
   coasting the brushless DC motor during the second off-time interval; and
   measuring the second inductive rise time.

5. The method of claim 1, wherein the step of calculating further comprises:
   determining the inductive rise time for an interval; and
   determining when the inductive rise time has peaked.

6. The method of claim 5, wherein the step of advancing further comprises advancing the brushless DC motor to the next commutation state when the inductive rise time has peaked.

7. The method of claim 6, wherein the interval further comprises an on-time interval and an off-time interval, and wherein step of determining the first inductive rise time for the first interval further comprises:
- driving the brushless DC motor during the on-time interval;
- coasting the brushless DC motor during the off-time interval; and
- measuring the first inductive rise time.

8. A method comprising:
- determining first and second inductive rise times for each of a pair of interval during a first commutation state of a brushless DC motor, wherein each interval has a predetermined duration;
- calculating the rate of change between the first and second inductive rise times; and
- advancing the brushless DC motor to a second commutation state based at least in part on the magnitude of the rate of change.

9. The method of claim 8, wherein the method further comprises adjusting the predetermined duration based at least in part on a speed of the brushless DC motor after the step of advancing.

10. The method of claim 9, wherein each interval further comprises an on-time interval and an off-time interval, and wherein the step of calculating further comprises:
- calculating a difference between the first and second inductive rise times; and
- dividing the difference between the first and second inductive rise times by the predetermined duration.

11. The method of claim 10, wherein each interval further comprises an on-time interval and an off-time interval, and wherein step of determining the first and second inductive rise times further comprises:
- driving the brushless DC motor during the on-time interval for each interval;
- coasting the brushless DC motor during the off-time interval for each interval; and
- measuring the first and second inductive rise times.

12. The method of claim 11, wherein the step of advancing further comprises advancing the brushless DC motor to the next commutation state if the magnitude of the rate of change is less than or equal to zero.

13. An apparatus comprising:
- a drive circuit that is configured to drive a brushless DC motor;
- a sense circuit that is coupled to drive circuit, wherein sense circuit is adapted to measure a first and second coil currents for a pair of intervals during a first commutation state of the brushless DC motor, and wherein each interval has a predetermined duration;
- control circuitry that is coupled to the sense circuit and the drive circuit, wherein the control circuitry is configured to determines first and second inductive rise times from first and second coil currents, and wherein the control circuitry is configured to calculate the rate of change between the first and second inductive rise times, and wherein the control circuit is configured to provide a signal to the drive circuit to advance the brushless DC motor to a second commutation state based at least in part on the magnitude of the rate of change.

14. The apparatus of claim 13, wherein the control circuitry further comprises a processor and memory with a computer program embodied thereon, wherein the computer program comprises computer code to calculate the rate of change between the first and second inductive rise times.

15. The apparatus of claim 14, wherein the computer program further comprises computer code for adjusting the predetermined duration based at least in part on a speed of the brushless DC motor.

16. The apparatus of claim 15, wherein each interval further comprises an on-time interval and an off time interval, and wherein the computer code to calculate the rate of change further comprises:
- computer code for calculating a difference between the first and second inductive rise times; and
- computer code for dividing the difference between the first and second inductive rise times by the predetermined duration.

17. The apparatus of claim 16, wherein the control circuitry is configured to advance the brushless DC motor to the next commutation state if the magnitude of the rate of change is less than or equal to zero.

18. The apparatus of claim 17, wherein the control circuitry further comprises a controller that is coupled to the processor and the drive circuit.

19. The apparatus of claim 18, wherein the drive circuit further comprises:
- a driver that is configured to be coupled to the brushless DC motor; and
- a pre-driver that is coupled between the controller and the driver.

20. The apparatus of claim 19, wherein the apparatus further comprises the brushless DC motor.

21. The apparatus of claim 20, wherein the processor further comprises a digital signals processor (DSP).

* * * * *